United States Patent
Ji et al.

(10) Patent No.: US 11,388,107 B2
(45) Date of Patent: Jul. 12, 2022

(54) METHOD, APPARATUS, AND SYSTEM FOR LOCATING ROOT CAUSE OF NETWORK ANOMALY, AND COMPUTER STORAGE MEDIUM

(71) Applicant: Huawei Technologies Co., Ltd., Shenzhen (CN)

(72) Inventors: Zhigang Ji, Beijing (CN); Siyu Yan, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 34 days.

(21) Appl. No.: 16/918,450

(22) Filed: Jul. 1, 2020

(65) Prior Publication Data
US 2021/0021540 A1  Jan. 21, 2021

(30) Foreign Application Priority Data
Jul. 18, 2019 (CN) .......................... 201910651631.2

(51) Int. Cl.
H04L 47/80 (2022.01)
H04L 41/02 (2022.01)
(Continued)

(52) U.S. Cl.
CPC ............ *H04L 47/805* (2013.01); *H04L 41/02* (2013.01); *H04L 43/06* (2013.01); *H04L 47/12* (2013.01);
(Continued)

(58) Field of Classification Search
None
See application file for complete search history.

(56) References Cited

U.S. PATENT DOCUMENTS

| 8,520,522 B1 | 8/2013 | Goldman et al. |
| 8,767,549 B2 | 7/2014 | Kashyap et al. |

(Continued)

FOREIGN PATENT DOCUMENTS

| JP | 5689333 B2 | 3/2015 |
| WO | 2016086385 A1 | 6/2016 |

OTHER PUBLICATIONS

Shuihai Hu, Yibo Zhu, Peng Cheng, Chuanxiong Guo, Kun Tan, Jitendra Padhye, Kai Chen, Tagger: Practical PFC Deadlock Prevention in Data Center Networks, pp. 451-463, Dec. 15 (Year: 2017).*

(Continued)

*Primary Examiner* — Christopher M Crutchfield
(74) *Attorney, Agent, or Firm* — Conley Rose, P.C.

(57) ABSTRACT

A method, an apparatus, and a system for locating a root cause of a network anomaly in the field of network technologies comprises, when a PFC deadlock occurs in a first egress port queue in a network device, the network device determines an abnormal data flow in the first egress port queue based on an access control list, where both an egress port and an ingress port of the abnormal data flow are uplink ports of the network device. The first egress port queue is any egress port queue in the network device. The network device sends anomaly information to a network management device, where the anomaly information includes an identifier of the abnormal data flow. The network management device transmits the identifier of the abnormal data flow to a display device for display by the display device.

20 Claims, 9 Drawing Sheets

(51) Int. Cl.
  *H04L 47/12* (2022.01)
  *H04L 9/40* (2022.01)
  *H04L 49/90* (2022.01)
  *H04L 43/06* (2022.01)

(52) U.S. Cl.
  CPC ............ *H04L 49/90* (2013.01); *H04L 63/101* (2013.01); *H04L 63/1425* (2013.01)

(56) References Cited

U.S. PATENT DOCUMENTS

| | | |
|---|---|---|
| 2007/0171814 A1 | 7/2007 | Florit et al. |
| 2012/0209411 A1 | 8/2012 | Ohkado et al. |
| 2014/0204738 A1* | 7/2014 | Carter .................. H04L 47/122 370/230 |
| 2018/0019947 A1 | 1/2018 | Shpiner et al. |
| 2018/0077110 A1* | 3/2018 | Huston, III ........... H04L 43/028 |
| 2018/0176210 A1* | 6/2018 | Comay ............... H04L 63/0876 |
| 2019/0173909 A1 | 6/2019 | Mixer et al. |

OTHER PUBLICATIONS

P. Lopez, J. M. Martinez, J. Duato, A Very Efficient Distributed Deadlock Detection Mechanism for Wormhole Networks, pp. 1-10 (Year: 1997).*

Shuihai Hu, Yibo Zhu, Peng Cheng, Chuanxiong Guo, Kun Tan, Jitendra Padhye and Kai Chen, Deadlocks in Datacenter Networks: Why Do They Form, and How to Avoid Them, pp. 1-7 (Year: 2016).*

Chuanxiong Guo, Haitao Wu, Zhong Deng, Gaurav Soni, Jianxi Ye, Jitendra Padhye, Marina Lipshteyn, RDMA over Commodity Ethernet at Scale, pp. 1-14 (Year: 2016).*

XP068152003 Xiang Yu, "PFC Deadlock Free in Data Center Network—LLDP use case: Self-learning of switch level and port type in CLOS network," Vienna, Austria, Jul. 2019, 1 pages.

* cited by examiner

METHOD, APPARATUS, AND SYSTEM FOR LOCATING ROOT CAUSE OF NETWORK ANOMALY, AND COMPUTER STORAGE MEDIUM

CROSS-REFERENCE TO RELATED APPLICATION

This application claims priority to Chinese Patent Application No. 201910651631.2, filed on Jul. 18, 2019, which is hereby incorporated by reference in its entirety.

TECHNICAL FIELD

This application relates to the field of network technologies, and in particular, to a method, an apparatus, and a system for locating a root cause of a network anomaly, and a computer storage medium.

BACKGROUND

Currently, a network usually uses a priority flow control (PFC) mechanism to implement a lossless network. In a conventional flow control mechanism, when a transmission link is congested, transmission of all data flows on the transmission link are blocked. However, in the PFC mechanism, a maximum of eight virtual channels can be created on one transmission link. Each virtual channel corresponds to a priority. Any virtual channel can be independently suspended or restarted without affecting transmission of data flows on another virtual channel.

Currently, communication between a transmit end and a receive end is implemented by forwarding a data packet by using a network device. In the PFC mechanism, one egress port of the network device usually corresponds to eight egress port queues, and each egress port queue is used to buffer data packets having a same priority. A process in which the network uses the PFC mechanism to implement the lossless network includes: the transmit end send a data packet; when an egress port queue of a network device on the transmission link is congested, the network device sends a PFC frame to an ingress direction (an upstream device) of a data packet in the egress port queue, where the PFC frame is used to notify the upstream device to temporarily stop sending a data packet at a priority level; and when the upstream device is also a network device, the upstream device buffers a received data packet at the priority level to a corresponding egress port queue, and if the egress port queue of the upstream device is congested, the upstream device sends a PFC frame to an ingress direction of a data packet in the egress port queue. In this way, back pressure is performed at each network device until the PFC frame arrives at the transmit end, to eliminate a packet loss caused by congestion in the network. However, a PFC deadlock may occur on the network that uses the PFC mechanism. If the PFC deadlock occurs on the network, data packets cannot be transmitted and received between the transmit end and the receive end, and therefore communication is interrupted, or even the entire network breaks down. The PFC deadlock refers to a phenomenon that egress port queues of a plurality of network devices are in a packet sending stop state for a long time because a lower-layer network device and an upper-layer network device in a network send PFC frames to each other.

Currently, a watchdog mechanism is usually used to resolve a PFC deadlock problem. A watchdog is used to monitor a packet sending status of an egress port queue of a network device. When the egress port queue is continuously in a packet sending stop state caused by a PFC frame within a specified time period, the watchdog determines that a PFC deadlock occurs. In this case, the network device may discard a data packet in the egress port queue or ignore a PFC frame received by the egress port queue, to force the egress port queue to send a packet to break the deadlock.

However, when the watchdog mechanism is used to resolve the PFC deadlock problem, a PFC deadlock can be broken for an egress port queue only after it is determined that the deadlock occurs in the egress port queue. If a PFC function is still enabled for the egress port queue, a PFC deadlock may occur again in the egress port queue in a subsequent data packet forwarding process. Therefore, the watchdog mechanism cannot resolve the PFC deadlock problem of the egress port queue by addressing a root cause.

SUMMARY

This application provides a method, an apparatus, and a system for locating a root cause of a network anomaly, and a computer storage medium, to resolve a problem that a PFC deadlock occurring in an egress port queue cannot be currently resolved by addressing a root cause.

According to a first aspect, a method for locating a root cause of a network anomaly is provided. When a PFC deadlock occurs in a first egress port queue in a network device, the network device determines an abnormal data flow in the first egress port queue, where both an egress port and an ingress port of the abnormal data flow are uplink ports of the network device, and the first egress port queue is any egress port queue in the network device. The network device sends anomaly information to a network management device, where the anomaly information includes an identifier of the abnormal data flow.

The network device determines an abnormal data flow in the first egress port queue based on an access control list. The access control list is an instruction list of a network device interface. An entry in the access control list usually includes two parts: a filter and an action. When the network device matches content defined in the filter, an action defined in the action is performed. The identifier of the abnormal data flow may be a mirrored data flow of the abnormal data flow or quintuple information of the abnormal data flow. The quintuple information of the abnormal data flow includes a source Internet Protocol (IP) address, a destination IP address, a source port, a destination port, and a transport layer protocol that are of the abnormal data flow.

In this application, the network device reports the anomaly information to the network management device. Because the anomaly information includes the identifier of the abnormal data flow in the egress port queue having the PFC deadlock, after obtaining the anomaly information, the network management device may display the identifier of the abnormal data flow on a display device, so that operation and maintenance personnel can determine a source device and a destination device of the abnormal data flow based on the identifier of the abnormal data flow, and can further check a transmission link between the source device and the destination device, to determine a root cause of the PFC deadlock, and resolve a PFC deadlock problem by addressing the root cause.

Optionally, when the PFC deadlock occurs in the first egress port queue in the network device, a process of determining, by the network device, the abnormal data flow in the first egress port queue based on the access control list includes: generating the access control list when the PFC deadlock occurs in the first egress port queue; and breaking the deadlock in the first egress port queue, and determining, based on the access control list, the abnormal data flow from data flows that are sent to the first egress port queue.

That the network device breaks the deadlock in the first egress port queue includes: the network device discards a data packet in the first egress port queue or ignores a PFC frame received by the first egress port queue, so that the first egress port queue forcibly sends a packet, and then the first egress port queue can receive a new data flow.

Optionally, the network device may delete the access control list after determining, based on the access control list, the abnormal data flow from the data flows that are sent to the first egress port queue.

Optionally, a maximum survival time of the access control list may be preset on the network device, and timing starts from a generation time point of the access control list. When a survival time of the access control list reaches the maximum survival time, the network device automatically deletes the access control list, to reduce memory occupation.

In this application, when a quantity of packets sent by the first egress port queue in a preset time period is 0 and the first egress port queue receives a PFC frame in the preset time period, the network device may determine that the PFC deadlock occurs in the first egress port queue.

Optionally, the anomaly information further includes an identifier of the network device and an identifier of a port in which the first egress port queue is located.

According to a second aspect, a method for locating a root cause of a network anomaly is provided. A network management device receives anomaly information sent by a network device, where the anomaly information includes an identifier of an abnormal data flow in a first egress port queue in the network device, the abnormal data flow is determined by the network device when a PFC deadlock occurs in the first egress port queue, both an egress port and an ingress port of the abnormal data flow are uplink ports of the network device, and the first egress port queue is any egress port queue in the network device; and the network management device transmits the identifier of the abnormal data flow to a display device for display by the display device.

Optionally, the anomaly information sent to the network management device by the network device further includes an identifier of the network device and information about a port in which the first egress port queue is located. In this application, when an access-layer network device and/or an aggregation-layer network device determine/determines that the PFC deadlock occurs in the first egress port queue, the anomaly information sent to the network management device may include the identifier of the abnormal data flow in the first egress port queue, the identifier of the network device in which the first egress port queue is located, and an identifier of a port in which the first egress port queue is located. When determining that the PFC deadlock occurs in the first egress port queue, a core network device may also send anomaly information to the network management device, where the anomaly information may include the identifier of the network device in which the first egress port queue is located and the identifier of the port in which the first egress port queue is located. When receiving anomaly information sent by a plurality of network devices, the network management device may obtain, from the plurality of network devices based on an identifier of each of the network devices and an identifier of a port in which an egress port queue having a PFC deadlock in each of the network devices is located, a plurality of target network devices that form a PFC deadlock loop; and the network management device transmits identifiers of the plurality of target network devices to the display device for display by the display device.

Optionally, that the network management device obtains, from the plurality of network devices based on the identifier of each of the network devices and the identifier of the port in which the egress port queue having the PFC deadlock in each of the network devices is located, the plurality of target network devices that form the PFC deadlock loop includes: the network management device generates a PFC deadlock loop based on the identifier of each of the network devices and the identifier of the port in which the egress port queue having the PFC deadlock in each of the network devices is located, where each loop node in the PFC deadlock loop corresponds to one of the target network devices; and that the network management device transmits the identifiers of the plurality of target network devices to the display device includes: the network management device transmits the PFC deadlock loop to the display device.

In this application, the network management device generates the PFC deadlock loop, and displays, on the display device as a PFC deadlock loop, identifiers of the plurality of target network devices that form the PFC deadlock loop. Therefore, a plurality of network devices on which a PFC deadlock occurs and transmission directions of PFC frames between the plurality of network devices can be visually presented to operation and maintenance personnel, so that the operation and maintenance personnel can locate problems.

According to a third aspect, an apparatus for locating a root cause of a network anomaly is provided. The apparatus includes a plurality of function modules, and the plurality of function modules work together to implement the method in the first aspect and implementations of the first aspect. The plurality of function modules may be implemented based on software, hardware, or a combination of software and hardware, and the plurality of function modules may be randomly combined or separated based on specific implementation.

According to a fourth aspect, another apparatus for locating a root cause of a network anomaly is provided. The apparatus includes a plurality of function modules, and the plurality of function modules work together to implement the method in the second aspect and implementations of the second aspect. The plurality of function modules may be implemented based on software, hardware, or a combination of software and hardware, and the plurality of function modules may be randomly combined or separated based on specific implementation.

According to a fifth aspect, a network device is provided. The network device includes a processor and a memory.

The memory is configured to store a computer program, and the computer program includes a program instruction.

The processor is configured to invoke the computer program, to implement the method for locating a root cause of a network anomaly according to any one of the first aspect and the implementations of the first aspect.

According to a sixth aspect, a network management device is provided. The network management device includes a processor and a memory.

The memory is configured to store a computer program, and the computer program includes a program instruction.

The processor is configured to invoke the computer program, to implement the method for locating a root cause of a network anomaly according to any one of the second aspect and the implementations of the second aspect.

According to a seventh aspect, a system for locating a root cause of a network anomaly, including a network management device and a network device in a communications network. The network device includes the apparatus for locating a root cause of a network anomaly according to the third aspect, and the network management device includes the apparatus for locating a root cause of a network anomaly according to the fourth aspect.

According to an eighth aspect, a computer storage medium is provided. The computer storage medium stores an instruction, and when the instruction is executed by a processor of a network device, the method for locating a root cause of a network anomaly according to any one of the first aspect and the implementations of the first aspect is implemented; or when the instruction is executed by a processor of a network management device, the method for locating a root cause of a network anomaly according to any one of the second aspect and the implementations of the second aspect is implemented.

According to a ninth aspect, a method for avoiding a network anomaly is provided, applied to a network device. The network device includes a plurality of egress port queues, and an access control list is configured in the network device. When the network device detects, based on a first entry in the access control list, that an abnormal data flow exists in a first egress port queue, the network device obtains a second egress port queue in which no abnormal data flow exists in the network device, where both an egress port and an ingress port of the abnormal data flow are uplink ports of the network device, and a port in which the first egress port queue is located is the same as a port where the second egress port queue is located. The network device schedules the abnormal data flow to the second egress port queue based on the first entry. The network device forwards the abnormal data flow by using the second egress port queue.

The first egress port queue is an egress port queue in which any abnormal data flow that matches an entry in the access control list is located. When the network device detects, based on the first entry in the access control list, that an abnormal data flow exists in the first egress port queue, the network device may schedule the abnormal data flow to the second egress port queue based on an action in the first entry, and forward the abnormal data flow by using the second egress port queue. When an egress port queue that is in an upstream device and that is used to buffer the abnormal data flow is congested, a back pressed PFC frame is transmitted to the second egress port queue, to avoid a PFC frame transmission closed loop formed in a communications network, in other words, avoid a PFC deadlock in an egress port queue.

Optionally, that the network device obtains the second egress port queue in which no abnormal data flow exists in the network device includes: the network device obtains the second egress port queue in which no abnormal data flow exists and a PFC function is enabled in the network device.

Because no abnormal data flow exists in the second egress port queue, there is temporarily no risk of PFC deadlock in the second egress port queue. After the abnormal data flow is scheduled to the second egress port queue, a PFC frame sent by the upstream device based on the abnormal data flow is back pressed to the second egress port queue, and a PFC frame transmission closed loop is not formed based on the first egress port queue, to avoid a PFC deadlock in an egress port queue.

Optionally, that the network device obtains the second egress port queue in which no abnormal data flow exists in the network device includes: the network device obtains the second egress port queue in which no abnormal data flow exists and a PFC function is enabled in the network device.

Because the PFC function is not enabled for the second egress port queue, the second egress port queue does not back press a PFC frame to the upstream device, and therefore a PFC frame transmission closed loop is not formed, to avoid a PFC deadlock in an egress port queue.

Optionally, that the network device schedules the abnormal data flow to the second egress port queue based on the first entry includes: the network device obtains a queue priority of the second egress port queue; and the network device modifies a VLAN priority of a data packet in the abnormal data flow based on the action in the first entry, so that a modified VLAN priority corresponds to the queue priority of the second egress port queue.

Optionally, that the network device schedules the abnormal data flow to the second egress port queue based on the first entry includes: the network device obtains a queue priority of the second egress port queue; and the network device modifies a DSCP value of a data packet in the abnormal data flow based on the action in the first entry, so that a modified coded value corresponds to the queue priority of the second egress port queue.

Optionally, the queue priority of the second egress port queue is lower than that of the first egress port queue.

According to a tenth aspect, an apparatus for avoiding a network anomaly is provided. The apparatus includes a plurality of function modules, and the plurality of function modules work together to implement the method in the ninth aspect and implementations of the ninth aspect. The plurality of function modules may be implemented based on software, hardware, or a combination of software and hardware, and the plurality of function modules may be randomly combined or separated based on specific implementation.

According to an eleventh aspect, a network device is provided. The network device includes a processor and a memory.

The memory is configured to store a computer program, and the computer program includes a program instruction.

The processor is configured to invoke the computer program, to implement the method for avoiding a network anomaly according to any one of the ninth aspect and the implementations of the ninth aspect.

According to a twelfth aspect, a computer storage medium is provided. The computer storage medium stores an instruction, and when the instruction is executed by a processor, the method for avoiding a network anomaly according to any one of the ninth aspect and the implementations of the ninth aspect is implemented.

Beneficial effects brought by the technical solutions provided in this application may include at least the following.

According to the method for locating a root cause of a network anomaly in an embodiment of this application, a network device reports anomaly information to a network management device. Because the anomaly information includes an identifier of an abnormal data flow in an egress port queue in which a PFC deadlock occurs, by displaying the identifier of the abnormal data flow on a display device, operation and maintenance personnel can determine a source device and a destination device of the abnormal data flow based on the identifier of the abnormal data flow, and can further check a transmission link between the source device and the destination device, to determine a root cause of the PFC deadlock, and resolve a PFC deadlock problem by addressing the root cause. In addition, identifiers of a plurality of target network devices that form a PFC deadlock loop are displayed on the display device as a PFC deadlock loop. Therefore, a plurality of network devices on which a PFC deadlock occurs and transmission directions of PFC frames between the plurality of network devices can be visually presented to the operation and maintenance personnel, so that the operation and maintenance personnel can locate problems.

According to the method for avoiding a network anomaly in an embodiment of this application, when a network device detects, based on a first entry in an access control list, that an abnormal data flow exists in a first egress port queue, the network device may schedule the abnormal data flow to a second egress port queue based on an action in the first entry, and forward the abnormal data flow by using the second egress port queue. When an egress port queue that is in an upstream device and that is used to buffer the abnormal data flow is congested, a back pressed PFC frame is transmitted to the second egress port queue, to avoid a PFC frame transmission closed loop formed based on the first egress port queue in a communications network, in other words, avoid a PFC deadlock in the egress port queue.

DESCRIPTION OF EMBODIMENTS

To make the objectives, technical solutions, and advantages of this application clearer, the following further describes the implementations of this application in detail with reference to the accompanying drawings.

Figure 1:
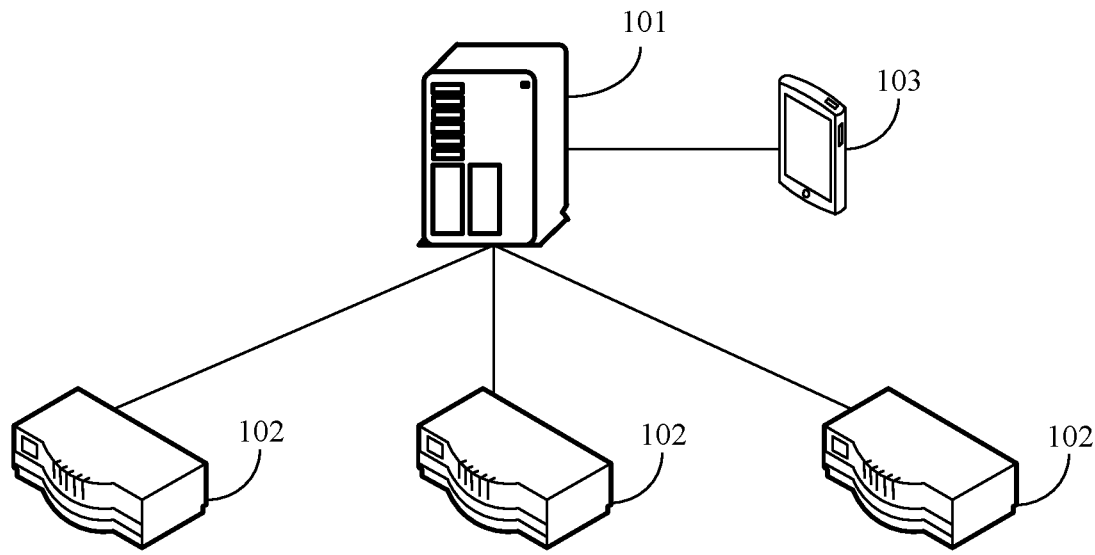
FIG. 1 is a schematic diagram of a structure of a system for locating a root cause of a network anomaly according to an embodiment of this application.

FIG. 1 is a schematic diagram of a structure of a system for locating a root cause of a network anomaly according to an embodiment of this application. As shown in FIG. 1, the system includes a network management device 101 and one or more network devices 102 in a communications network. A quantity of the network devices in FIG. 1 is merely used as an example, and is not intended to limit the communications network provided in this embodiment of this application.

Optionally, the network management device 101 may be a server, a server cluster including several servers, or a cloud computing service center. The network device 102 may be a switch, a router, or the like. The network management device 101 is connected to each network device 102 in the communications network by using a wired network or a wireless network.

Optionally, referring to FIG. 1, the system for locating a root cause of a network anomaly further includes a display device 103. The display device 103 is connected to the network management device 101 by using a wired network or a wireless network. The display device 103 is configured to display information transmitted by the network management device 101, so that operation and maintenance personnel can view the information, and then locate a network anomaly cause based on the information. The display device may be a device that has a display function, such as an operation and maintenance support system or a terminal device. The display device 103 may alternatively be integrated with the network management device 101, in other words, information is displayed on the network management device 101 for the operation and maintenance personnel to view. In this embodiment of this application, an example in which the display device 103 and the network management device 101 are different devices is used for description.

The communications network provided in this embodiment of this application may be a data center network (DCN), a metropolitan area network, a wide area network, a campus network, or the like. A type of the communications network is not limited in this embodiment of this application. Optionally, a network architecture of the communications network provided in this embodiment of this application may be a two-stage Clos network architecture or a three-stage Clos network architecture.

Figure 2:
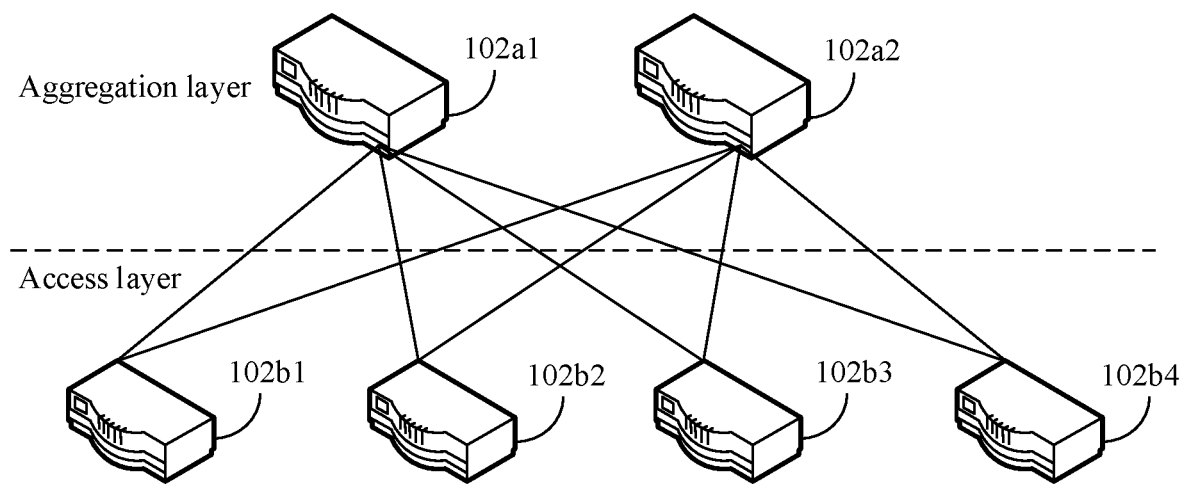
FIG. 2 is a schematic diagram of a structure of a communications network in a two-stage Clos network architecture according to an embodiment of this application.

For example, FIG. 2 is a schematic diagram of a structure of the communications network in the two-stage Clos network architecture according to this embodiment of this application. As shown in FIG. 2, the communications network includes an aggregation layer and an access layer, and the communications network may also be referred to as a layer-2 network. The aggregation layer is a high-speed switching backbone of the communications network, and the access layer is used to connect a workstation (including a terminal or a server) to the communications network. Optionally, referring to FIG. 2, the aggregation layer includes two aggregation-layer network devices 102a1 and 102a2, and the access layer includes four access-layer network devices 102b1 to 102b4. The communications network shown in FIG. 2 may be a fat tree or leaf-spine topology network. In this case, the aggregation-layer network devices 102a1 and 102a2 are spine switches, and the access-layer network devices 102b1 to 102b4 are leaf switches. A quantity of uplinks of each leaf switch is equal to a quantity of spine switches, and a quantity of downlinks of each spine switch is equal to a quantity of leaf switches.

Figure 3:
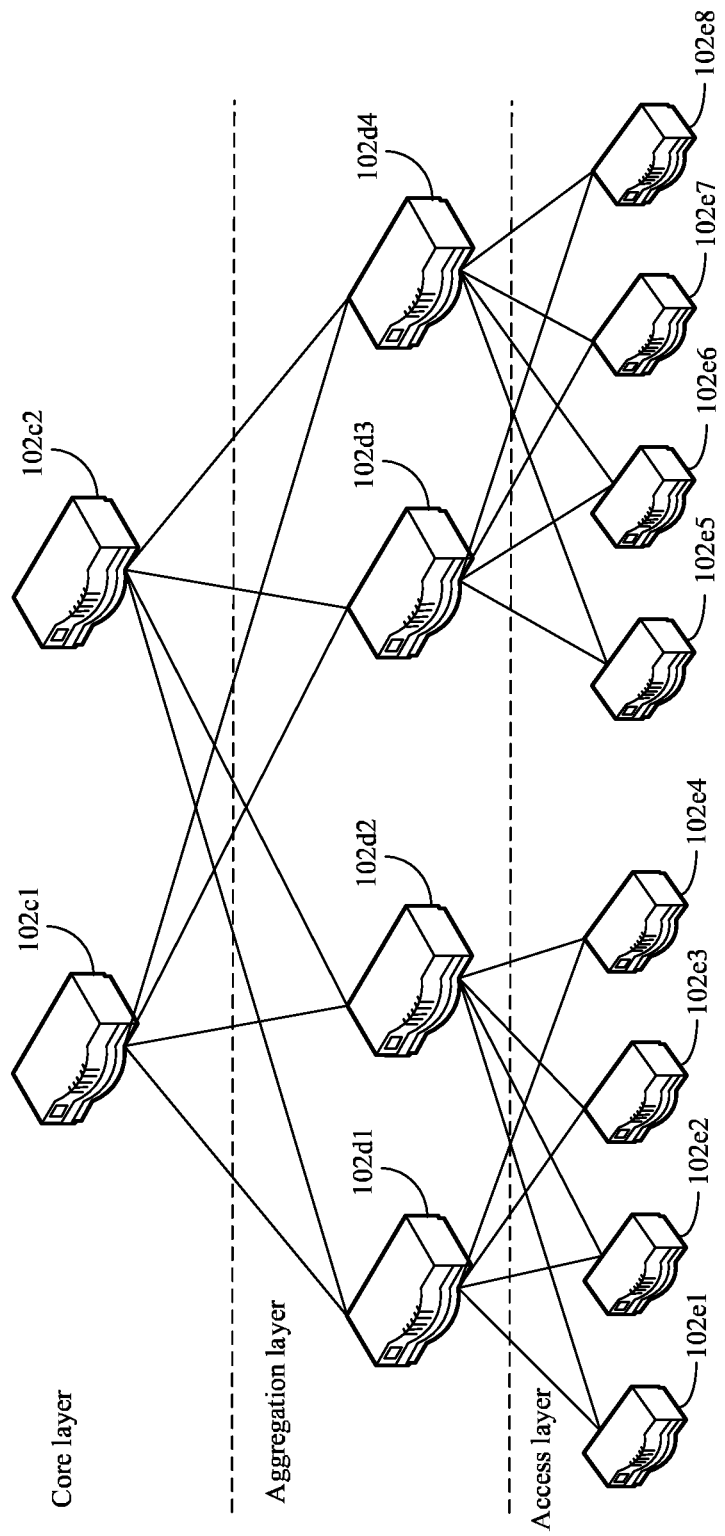
FIG. 3 is a schematic diagram of a structure of a communications network in a three-stage Clos network architecture according to an embodiment of this application.

For example, FIG. 3 is a schematic diagram of a structure of the communications network in the three-stage Clos network architecture according to an embodiment of this application. As shown in FIG. 3, the communications network includes a core layer, an aggregation layer and an access layer, and the communications network may also be referred to as a layer-3 network. The core layer is a high-speed switching backbone of the communications network. The aggregation layer is used to provide an aggregation connection (connecting the access layer and the core layer). The access layer is used to connect a workstation to the communications network. Optionally, referring to FIG. 3, the core layer includes two core network devices 102c1 and 102c2. The aggregation layer includes four aggregation-layer network devices 102d1 to 102d4, where the aggregation-layer network devices 102d1 and 102d2 form a first group, and the aggregation-layer network devices 102d3 and 102d4 form a second group. The access layer includes eight access-layer network devices 102e1 to 102e8, where four access-layer network devices 102e1 to 102e4 are connected to the first group of aggregation-layer network devices 102d1 and 102d2, the other four access-layer network devices 102e5 to 102e8 are connected to the second group of aggregation-layer network devices 102d3 and 102d4. Optionally, the aggregation layer and the access layer of the communications network may form a fat tree topology network. In this case, the aggregation-layer network devices 102d1 to 102d4 are spine switches, and the access-layer network devices 102e1 to 102e8 are leaf switches.

In embodiments of this application, a port used by the network device to communicate with an upstream device is defined as an uplink port, and a port used by the network device to communicate with a downstream device is defined as a downlink port. For example, in the communications network shown in FIG. 3, a port used by an access-layer network device (leaf switch) to connect an aggregation-layer network device (spine switch) is an uplink port, and a port used to connect a workstation is a downlink port. A port used by an aggregation-layer network device to connect a core network device is an uplink port, and a port used to connect an access-layer network device is a downlink port. A port used by a core network device to connect an access-layer network device is a downlink port, and a port used to connect another network is an uplink port (not shown in the figure).

Optionally, the network device may receive a data packet by using a downlink port, and send the data packet by using an uplink port. For example, an access-layer network device may receive, by using a downlink port, a data packet sent by a workstation (transmit end), and send the data packet to an aggregation-layer network device by using an uplink port. Alternatively, the network device may receive a data packet by using a downlink port, and send the data packet by using another downlink port. For example, an aggregation-layer network device may receive, by using a downlink port, a data packet sent by an access-layer network device, and send the data packet to another access-layer network device by using another downlink port. Alternatively, the network device may receive a data packet by using an uplink port, and send the data packet by using a downlink port. For example, an access-layer network device may receive, by using an uplink port, a data packet sent by an aggregation-layer network device, and send the data packet to a workstation (receive end) by using a downlink port.

In a packet-loss-sensitive network, for example, a remote direct memory access (RDMA) network, a loss of any data packet causes retransmission of a large quantity of data packets, which severely affects data transmission performance. Therefore, a PFC mechanism is usually enabled in the packet-loss-sensitive network to ensure that no packet is lost. A PFC deadlock may occur in the communications network when a hardware device (including a network device or a receive end) in the communications network is faulty, a transmission link is faulty, and/or a routing table is abnormal.

Figure 4:
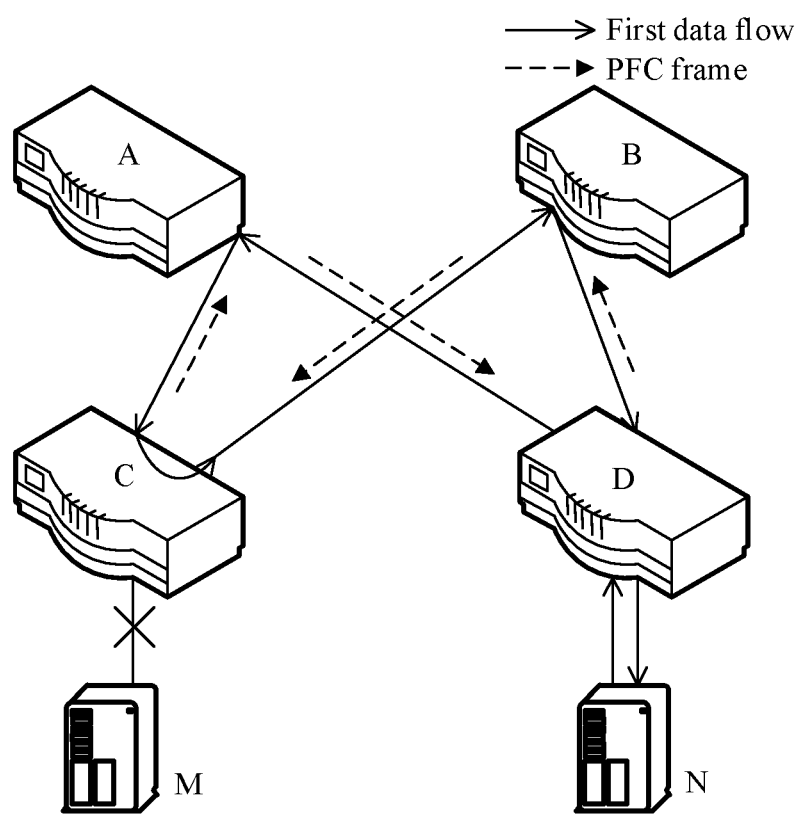
FIG. 4 is a schematic diagram of a PFC deadlock in a communications network according to an embodiment of this application.

For example, FIG. 4 is a schematic diagram of a PFC deadlock in the communications network according to an embodiment of this application. As shown in FIG. 4, the communications network includes a network device A, a network device B, a network device C, and a network device D. The network device A and the network device B are upper-layer network devices, and the network device C and the network device D are lower-layer network devices. For example, in a layer-2 network, the network device A and the network device B are aggregation-layer network devices, and the network device C and the network device D are access-layer network devices. For another example, in a layer-3 network, the network device A and the network device B are core network devices, and the network device C and the network device D are aggregation-layer network devices; or, the network device A and the network device B are aggregation-layer network devices, and the network device C and the network device D are access-layer network devices. In FIG. 4, an example in which the network device A and the network device B are aggregation-layer network devices, and the network device C and the network device D are access-layer network devices is used for description. Referring to FIG. 4, the network device C is connected to a server M, and the network device D is connected to a server N. It is assumed that a normal transmission path of a first data flow sent by the server N to the server M is: the server N→the network device D→the network device A→the network device C→the server M. When the server M is faulty, the network device C cannot transmit the first data flow to the server M. In this case, to prevent a packet loss, the network device C transmits the first data flow to the network device B, the network device B transmits the first data flow to the network device D, and finally the network device D transmits the first data flow back to the server N. If egress port queues that are in the network device A, the network device B, the network device C, and the network device D and that are used to buffer the first data flow are congested at the same time, the network device D sends a PFC frame to the network device B, the network device B sends the PFC frame to the network device C, the network device C sends the PFC frame to the network device A, and the network device A sends the PFC frame to the network device D, to form a PFC frame transmission closed loop. Consequently, a PFC deadlock occurs in the egress port queue that is in each network device and that is used to buffer the first data flow, in other words, a PFC deadlock phenomenon occurs in the communications network.

Currently, when a watchdog mechanism is used to resolve a PFC deadlock problem, a PFC deadlock can be broken for a single network device only after it is determined that the deadlock occurs. However, a cause of the PFC deadlock cannot be determined, and the PFC deadlock cannot be avoided. In other words, the PFC deadlock problem cannot be resolved by addressing a root cause. The following embodiments of this application separately provide a method for locating a root cause of a network anomaly and a method for avoiding a network anomaly, to resolve the foregoing problem.

Figure 5:
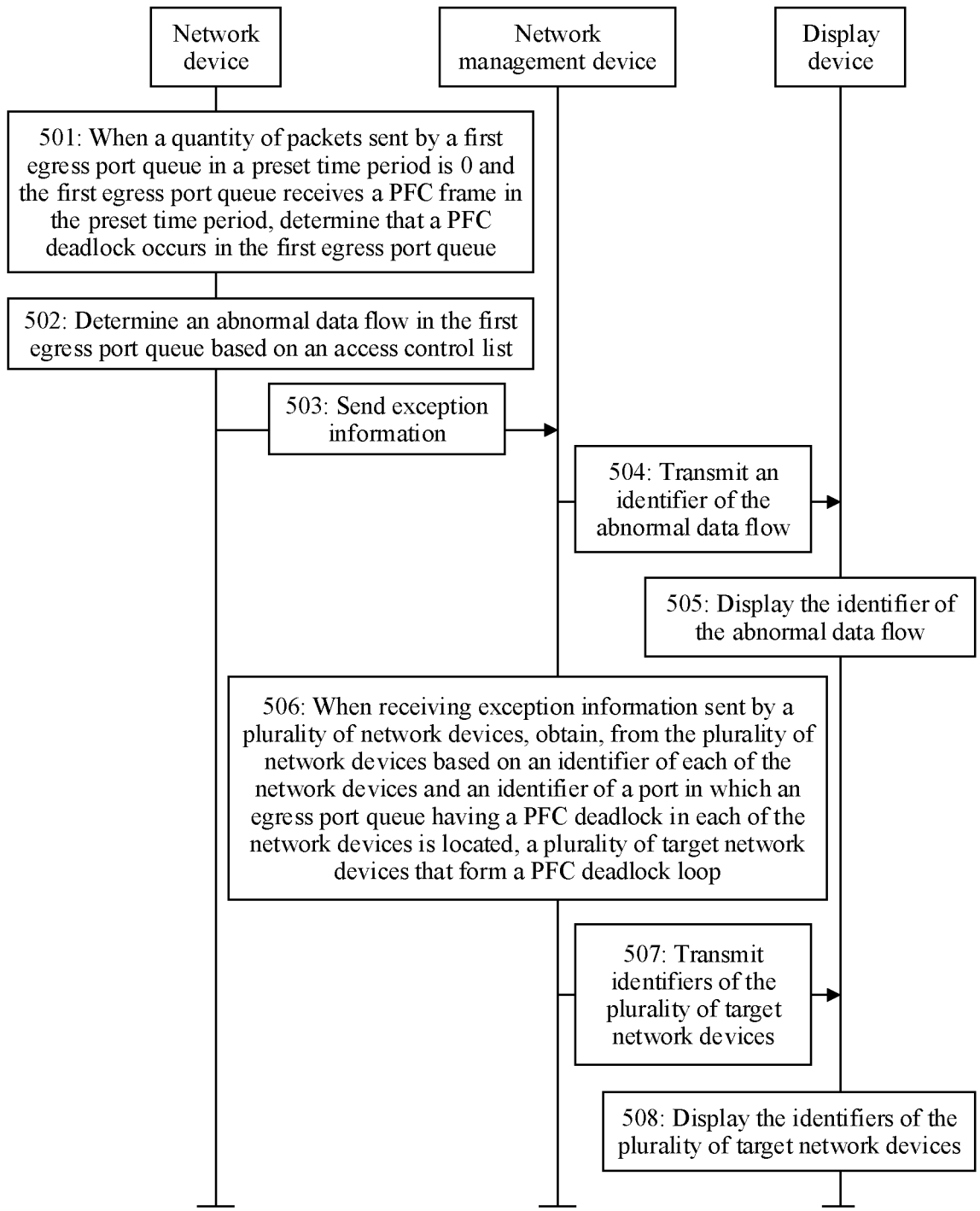
FIG. 5 is a flowchart of a method for locating a root cause of a network anomaly according to an embodiment of this application.

FIG. 5 is a flowchart of a method for locating a root cause of a network anomaly according to an embodiment of this application. The method is applied to the system for locating a root cause of a network anomaly shown in FIG. 1. As shown in FIG. 5, the method includes the following steps.

Step 501: When a quantity of packets sent by a first egress port queue of a network device in a preset time period is 0 and the first egress port queue receives a PFC frame in the preset time period, the network device determines that a PFC deadlock occurs in the first egress port queue.

Figure 6:
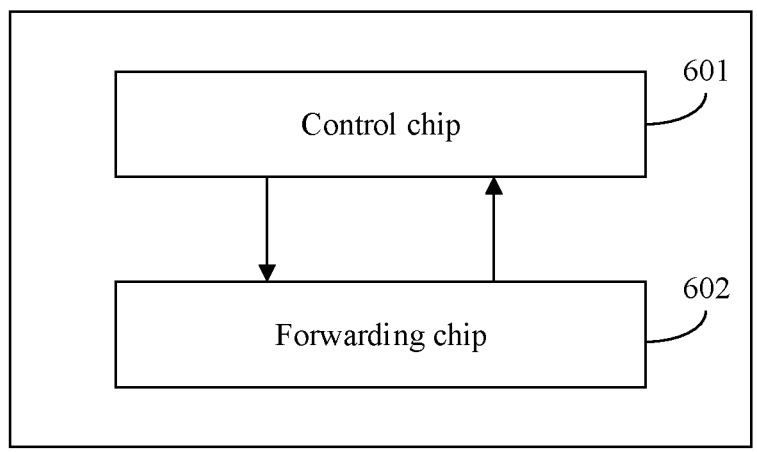
FIG. 6 is a schematic diagram of a structure of a network device according to an embodiment of this application.

Optionally, FIG. 6 is a schematic diagram of a structure of the network device according to this embodiment of this application. As shown in FIG. 6, the network device includes a control chip 601 and a forwarding chip 602. An egress port queue is located on the forwarding chip 602. The control chip 601 communicates with the forwarding chip 602 by using a physical connection. The control chip may be a central processing unit (CPU), an Ethernet network processor (ENP), or a field-programmable gate array (FPGA) chip. Optionally, the control chip and the forwarding chip in the network device may also be integrated, in other words, a control function and a forwarding function are integrated into one chip.

When the network device detects, by using the forwarding chip, that the quantity of packets sent by the first egress port queue in the preset time period is 0 and the first egress port queue receives a PFC frame in the preset time period, it may be determined that the first egress port queue stops sending packets because of the PFC frame, and then it is determined that a PFC deadlock occurs in the first egress port queue. Duration of the preset time period may be configured based on an actual requirement. For example, the duration of the preset time period may be 100 milliseconds.

Optionally, the network device periodically detects a throughput of each egress port queue and whether a PFC frame is received. When detecting that a quantity of packets sent by an egress port queue in a first detection period is 0 and a PFC frame is received, the network device predetermines that a PFC deadlock occurs in the egress port queue. When detecting that a quantity of packets sent by the egress port queue in a second detection period is 0 and a PFC frame is received, the network device determines that a PFC deadlock occurs in the egress port queue; otherwise, the network device performs actions in the first detection period again. The second detection period and the first detection period are adjacent in time sequence, in other words, an end time point of the first detection period is a start time point of the second detection period.

Step 502: The network device determines an abnormal data flow in the first egress port queue based on an access control list.

Both an egress port and an ingress port of the abnormal data flow are uplink ports of the network device, and the first egress port queue is any egress port queue in the network device. It can be learned from the schematic diagram of the PFC deadlock shown in FIG. 4 that a PFC deadlock occurs in a communications network because a data flow that enters from an uplink port and that is sent from another uplink port exists in a network device. Therefore, it may be determined that a data flow whose egress port and ingress port are uplink ports of a network device is an abnormal data flow. In this embodiment of this application, after a PFC deadlock occurs in the first egress port queue, the network device having the uplink ports may determine the abnormal data flow in the first egress port queue based on the access control list (ACL). The network device having the uplink ports includes an access-layer network device and/or an aggregation-layer network device.

Optionally, the access control list in the network device may be preconfigured, or may be generated by the network device when the network device determines that the PFC deadlock occurs in the first egress port queue. In this embodiment of this application, an example in which the access control list is generated by the network device after the network device determines that the PFC deadlock occurs in the first egress port queue is used for description. After the network device determines that the PFC deadlock occurs in the first egress port queue, a process in which the network device determines the abnormal data flow in the first egress port queue based on the access control list includes the network device generates the access control list when the PFC deadlock occurs in the first egress port queue; and the network device breaks the deadlock in the first egress port queue, and determines, based on the access control list, the abnormal data flow from data flows that are sent to the first egress port queue. That the network device breaks the deadlock in the first egress port queue includes: the network device discards a data packet in the first egress port queue or ignores the PFC frame received by the first egress port queue, so that the first egress port queue forcibly sends a packet, and then the first egress port queue can receive a new data flow.

The access control list is an instruction list of a network device interface. An entry in the access control list usually includes two parts: a filter and an action. When the network device matches content defined in the filter, an action defined in the action is performed. For example, it is assumed that the network device includes four uplink ports: an uplink port A, an uplink port B, an uplink port C, and an uplink port D, and a port (an egress port) in which the first egress port queue is located is the uplink port B. In this case, the abnormal data flow may be determined from the data flows that are sent to the first egress port queue by using the following three entries:

1. filter: (input: A, output: B), action: mirror;
2. filter: (input: C, output: B), action: mirror; and
3. filter: (input: D, output: B), action: mirror.

The first entry is used to match an abnormal data flow whose ingress port is the uplink port A and whose egress port is the uplink port B. The second entry is used to match an abnormal data flow whose ingress port is the uplink port C and whose egress port is the uplink port B. The third entry is used to match an abnormal data flow whose ingress port is the uplink port D and whose egress port is the uplink port B. The "action: mirror" indicates that after an abnormal data flow matching port information is matched, a mirroring operation is performed on the abnormal data flow, and the abnormal data flow is collected to a control plane, to obtain an identifier of the abnormal data flow.

Optionally, the network device deletes the access control list after determining, based on the access control list, the abnormal data flow from the data flows that are sent to the first egress port queue. Optionally, a maximum survival time of the access control list may be preset on the network device, and timing starts from a generation time point of the access control list. When a survival time of the access control list reaches the maximum survival time, the network device automatically deletes the access control list, to reduce memory occupation. For example, the maximum survival time of the access control list may be set to 10 milliseconds.

Step 503: The network device sends anomaly information to a network management device.

The anomaly information includes the identifier of the abnormal data flow. Optionally, the identifier of the abnormal data flow may be a mirrored data flow of the abnormal data flow or quintuple information of the abnormal data flow. The quintuple information of the abnormal data flow includes a source IP address, a destination IP address, a source port, a destination port, and a transport layer protocol that are of the abnormal data flow.

Optionally, the anomaly information further includes an identifier of the network device in which the first egress port queue having the PFC deadlock is located and an identifier of the port in which the first egress port queue is located. The identifier of the network device may be a media access control (MAC) address of the network device, and the identifier of the port may be a port number.

Step 504: The network management device transmits the identifier of the abnormal data flow to a display device.

Optionally, if the network management device has a display function, the network management device does not need to transmit the identifier of the abnormal data flow to the display device, but directly outputs the identifier of the abnormal data flow to a display module of the network management device.

Step 505: The display device displays the identifier of the abnormal data flow.

In this embodiment of this application, the network device reports the anomaly information to the network management device. Because the anomaly information includes the identifier of the abnormal data flow in the egress port queue having the PFC deadlock, operation and maintenance personnel can determine a source device and a destination device of the abnormal data flow based on the identifier of the abnormal data flow that is displayed on the display device, and can further check a transmission link between the source device and the destination device, to determine a root cause of the PFC deadlock, and resolve a PFC deadlock problem by addressing the root cause.

Optionally, when the anomaly information further includes the identifier of the network device in which the first egress port queue having the PFC deadlock is located and the identifier of the port in which the first egress port queue is located, the following steps 506 to 508 are continuously performed.

Step 506: When receiving anomaly information sent by a plurality of network devices, the network management device obtains, from the plurality of network devices based on an identifier of each of the network devices and an identifier of a port in which an egress port queue having a PFC deadlock in each of the network devices is located, a plurality of target network devices that form a PFC deadlock loop.

In this embodiment of this application, when an access-layer network device and/or an aggregation-layer network device determine/determines that the PFC deadlock occurs in the first egress port queue, the anomaly information sent to the network management device may include the identifier of the abnormal data flow in the first egress port queue, the identifier of the network device in which the first egress port queue is located, and the identifier of the port in which the first egress port queue is located. When determining that the PFC deadlock occurs in the first egress port queue, a core network device may also send anomaly information to the network management device, where the anomaly information may include the identifier of the network device in which the first egress port queue is located and the identifier of the port in which the first egress port queue is located.

Optionally, after receiving the anomaly information sent by the plurality of network devices, the network management device may generate a PFC deadlock loop based on the identifier of each of the network devices and the identifier of the port in which the egress port queue having the PFC deadlock in each of the network devices is located, where each loop node in the PFC deadlock loop corresponds to one of the target network devices. For example, the network management device obtains, from the plurality of network devices based on a network topology and a directed graph loop detection algorithm, the plurality of target network devices that can form the PFC deadlock loop, and generates the PFC deadlock loop. The PFC deadlock loop is formed at a granularity level of an egress port queue.

Step 507: The network management device transmits identifiers of the plurality of target network devices to the display device.

Optionally, the network management device transmits the PFC deadlock loop to the display device. If the network management device has a display function, the network management device does not need to transmit the PFC deadlock loop to the display device, but directly outputs the PFC deadlock loop to the display module of the network management device.

Step 508: The display device displays the identifiers of the plurality of target network devices.

Figure 7:
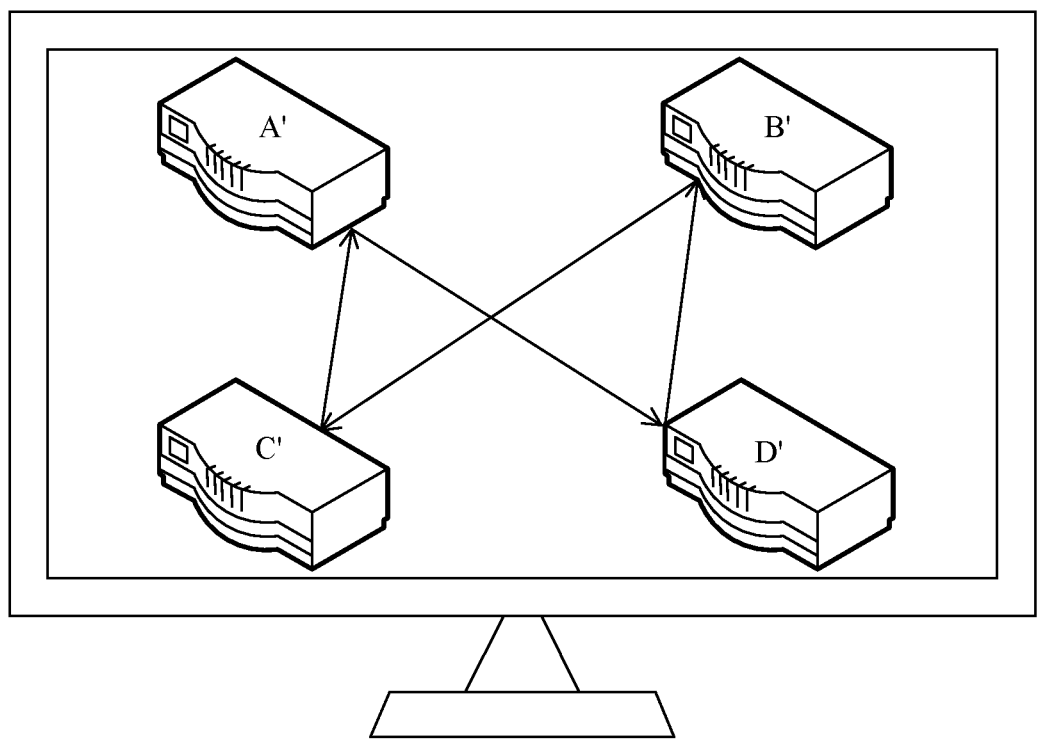
FIG. 7 is a schematic diagram of displaying a PFC deadlock loop on a display device according to an embodiment of this application.

Optionally, the display device displays the PFC deadlock loop. For example, FIG. 7 is a schematic diagram of displaying the PFC deadlock loop on the display device according to this embodiment of this application. As shown in FIG. 7, the PFC deadlock loop includes four loop nodes. The four loop nodes respectively correspond to a network device A', a network device B', a network device C', and a network device D'. Arrows in the figure indicate transmission directions of PFC frames. The identifiers of the plurality of target network devices that form the PFC deadlock loop are displayed on the display device as a PFC deadlock loop. Therefore, a plurality of network devices on which a PFC deadlock occurs and transmission directions of PFC frames between the plurality of network devices can be visually presented to the operation and maintenance personnel, so that the operation and maintenance personnel can locate problems.

A sequence of the steps in the method for locating a root cause of a network anomaly provided in this embodiment of this application may be properly adjusted. For example, the step 506 may be performed before the step 504, the step 504 and the step 507 may be performed at the same time, and the step 505 and the step 508 may be performed at the same time. A step may also be correspondingly added or removed based on a situation, for example, the step 506 to the step 508 may not be performed. Any variation readily figured out by a person skilled in the art within the technical scope disclosed in this application shall fall within the protection scope of this application, and details are not described herein.

According to the method for locating a root cause of a network anomaly in this embodiment of this application, the network device reports the anomaly information to the network management device. Because the anomaly information includes the identifier of the abnormal data flow in the egress port queue having the PFC deadlock, the operation and maintenance personnel can determine the source device and the destination device of the abnormal data flow based on the identifier of the abnormal data flow that is displayed on the display device, and can further check the transmission link between the source device and the destination device, to determine the root cause of the PFC deadlock, and resolve the PFC deadlock problem by addressing the root cause. In addition, the identifiers of the plurality of target network devices that form the PFC deadlock loop are displayed on the display device as a PFC deadlock loop. Therefore, a plurality of network devices on which a PFC deadlock occurs and transmission directions of PFC frames between the plurality of network devices can be visually presented to the operation and maintenance personnel, so that the operation and maintenance personnel can locate problems.

Figure 8:
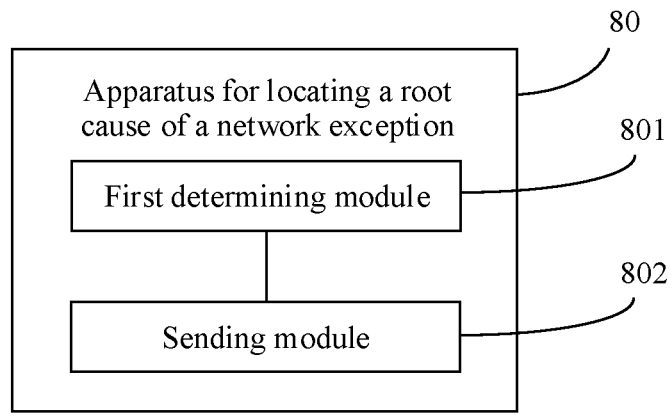
FIG. 8 is a schematic diagram of a structure of an apparatus for locating a root cause of a network anomaly according to an embodiment of this application.

FIG. 8 is a schematic diagram of a structure of an apparatus 80 for locating a root cause of a network anomaly according to an embodiment of this application. The method is applied to the network device 102 in the system for locating a root cause of a network anomaly shown in FIG. 1. As shown in FIG. 8, the apparatus 80 includes a first determining module 801, configured to determine, when a PFC deadlock occurs in a first egress port queue in the network device, an abnormal data flow in the first egress port queue based on an access control list, where both an egress port and an ingress port of the abnormal data flow are uplink ports of the network device, and the first egress port queue is any egress port queue in the network device; and a sending module 802, configured to send anomaly information to a network management device, where the anomaly information includes an identifier of the abnormal data flow.

Optionally, the first determining module is configured to: generate the access control list when the PFC deadlock occurs in the first egress port queue; and break the deadlock in the first egress port queue, and determine, based on the access control list, the abnormal data flow from data flows that are sent to the first egress port queue.

Figure 9:
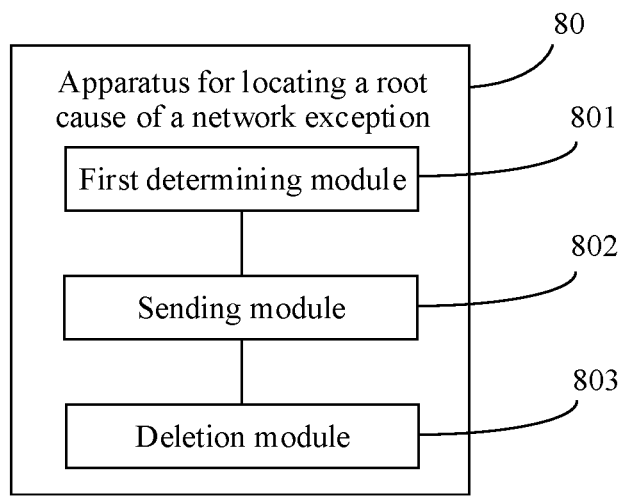
FIG. 9 is a schematic diagram of a structure of another apparatus for locating a root cause of a network anomaly according to an embodiment of this application.

Optionally, as shown in FIG. 9, the apparatus 80 further includes a deletion module 803, configured to delete the access control list after the abnormal data flow is determined, based on the access control list, from the data flows that are sent to the first egress port queue.

Figure 10:
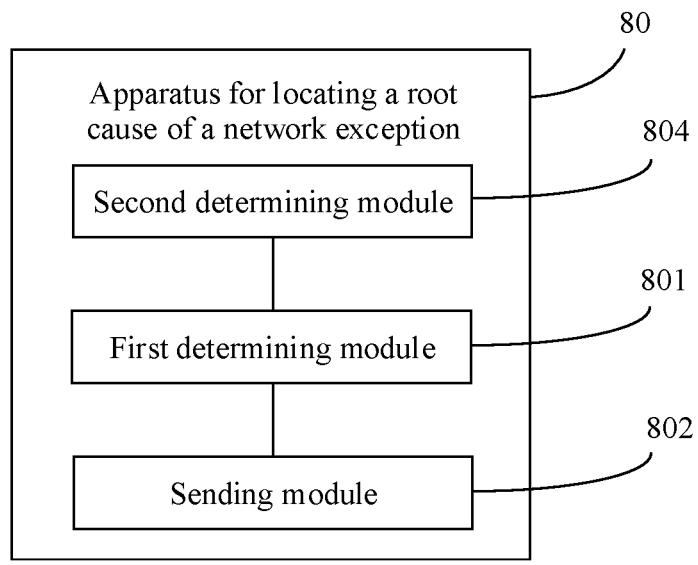
FIG. 10 is a schematic diagram of a structure of still another apparatus for locating a root cause of a network anomaly according to an embodiment of this application.

Optionally, as shown in FIG. 10, the apparatus 80 further includes a second determining module 804, configured to determine, when a quantity of packets sent by the first egress port queue in a preset time period is 0 and the first egress port queue receives a PFC frame in the preset time period, that the PFC deadlock occurs in the first egress port queue.

Optionally, the anomaly information further includes an identifier of the network device and an identifier of a port in which the first egress port queue is located.

According to the apparatus for locating a root cause of a network anomaly in this embodiment of this application, the network device reports the anomaly information to the network management device. Because the anomaly information includes the identifier of the abnormal data flow in the egress port queue having the PFC deadlock, operation and maintenance personnel can determine a source device and a destination device of the abnormal data flow based on the identifier of the abnormal data flow that is displayed on the display device, and can further check a transmission link between the source device and the destination device, to determine a root cause of the PFC deadlock, and resolve a PFC deadlock problem by addressing the root cause.

Figure 11:
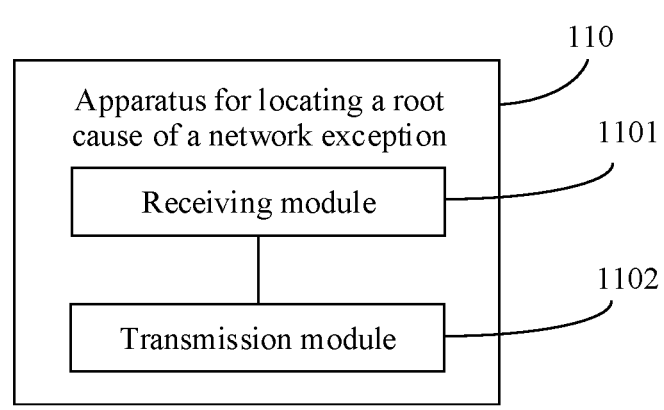
FIG. 11 is a schematic diagram of a structure of an apparatus for locating a root cause of a network anomaly according to another embodiment of this application.

FIG. 11 is a schematic diagram of a structure of an apparatus for locating a root cause of a network anomaly according to another embodiment of this application. The apparatus is applied to the network management device 101 in the system for locating a root cause of a network anomaly shown in FIG. 1. As shown in FIG. 11, the apparatus 110 includes a receiving module 1101, configured to receive anomaly information sent by a network device, where the anomaly information includes an identifier of an abnormal data flow in a first egress port queue in the network device, the abnormal data flow is determined by the network device based on an access control list when a PFC deadlock occurs in the first egress port queue, both an egress port and an ingress port of the abnormal data flow are uplink ports of the network device, and the first egress port queue is any egress port queue in the network device; and a transmission module 1102, configured to transmit the identifier of the abnormal data flow to a display device for display by the display device.

Figure 12:
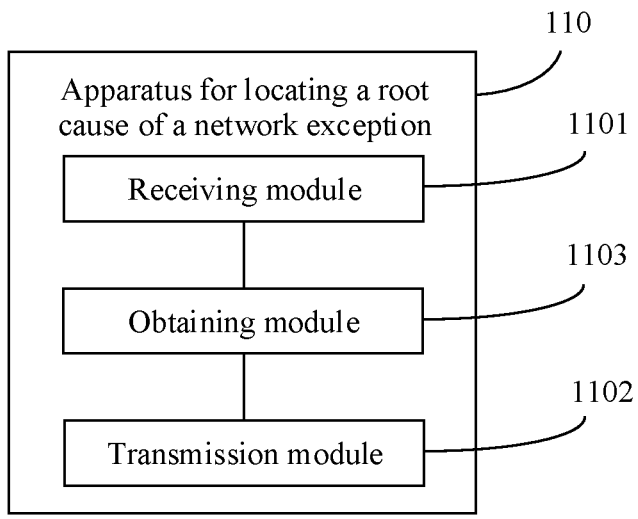
FIG. 12 is a schematic diagram of a structure of another apparatus for locating a root cause of a network anomaly according to another embodiment of this application.

Optionally, the anomaly information further includes an identifier of the network device and information about a port in which the first egress port queue is located. As shown in FIG. 12, the apparatus 110 further includes an obtaining module 1103, configured to: when anomaly information sent by a plurality of network devices is received, obtain, from the plurality of network devices based on an identifier of each of the network devices and an identifier of a port in which an egress port queue having a PFC deadlock in each of the network devices is located, a plurality of target network devices that form a PFC deadlock loop. The transmission module is further configured to transmit identifiers of plurality of target network devices to the display device for display by display device.

Optionally, the obtaining module 1103 is configured to generate a PFC deadlock loop based on the identifier of each of the network devices and the identifier of the port in which the egress port queue having the PFC deadlock in each of the network devices is located, where each loop node in the PFC deadlock loop corresponds to one of the target network devices; and the transmission module 1102 is configured to transmit the PFC deadlock loop to the display device.

According to the apparatus for locating a root cause of a network anomaly in this embodiment of this application, the network management device receives, by using the receiving module, the anomaly information reported by the network device. Because the anomaly information includes the identifier of the abnormal data flow in the egress port queue having the PFC deadlock, operation and maintenance personnel can determine a source device and a destination device of the abnormal data flow based on the identifier of the abnormal data flow that is displayed on the display device, and can further check a transmission link between the source device and the destination device, to determine a root cause of the PFC deadlock, and resolve a PFC deadlock problem by addressing the root cause. In addition, identifiers of a plurality of target network devices that form a PFC deadlock loop are displayed on the display device as a PFC deadlock loop. Therefore, a plurality of network devices on which a PFC deadlock occurs and transmission directions of PFC frames between the plurality of network devices can be visually presented to the operation and maintenance personnel, so that the operation and maintenance personnel can locate problems.

Figure 13:
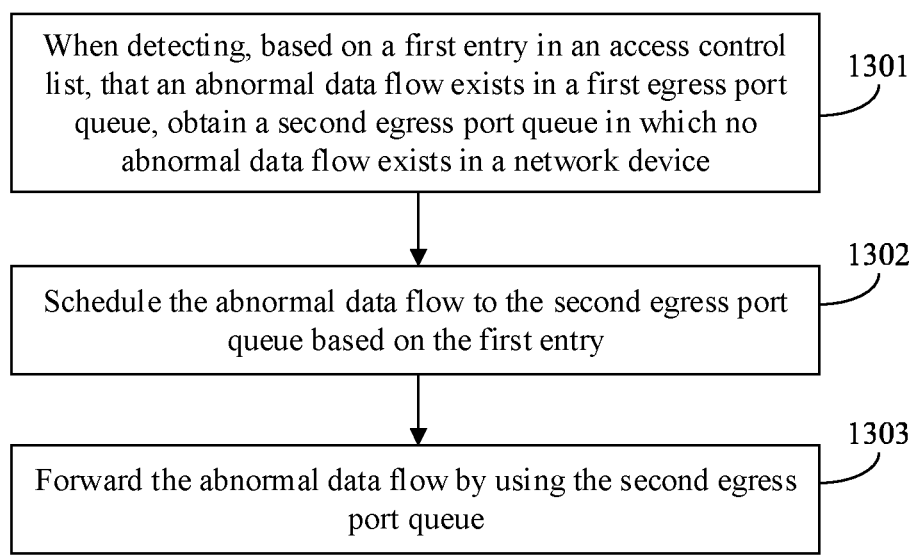
FIG. 13 is a flowchart of a method for avoiding a network anomaly according to an embodiment of this application.

FIG. 13 is a flowchart of a method for avoiding a network anomaly according to an embodiment of this application. The method is applied to a network device. The network device includes a plurality of egress port queues, and an access control list is configured in the network device. Optionally, the network device may be an access-layer network device in the communications network shown in FIG. 2, or the network device may be an aggregation-layer network device or an access-layer network device in the communications network shown in FIG. 3. As shown in FIG. 13, the method includes the following steps.

Step 1301: When detecting, based on a first entry in an access control list, that an abnormal data flow exists in a first egress port queue, obtain a second egress port queue in which no abnormal data flow exists in the network device.

Both an egress port and an ingress port of the abnormal data flow are uplink ports of the network device, the first egress port queue is an egress port queue where any abnormal data flow that matches an entry in the access control list is located, and a port in which the first egress port queue is located is the same as a port where the second egress port queue is located.

The access control list is an instruction list of a network device interface. An entry in the access control list usually includes two parts: a filter and an action. When the network device matches content defined in the filter, an action defined in the action is performed. For example, it is assumed that the network device includes four uplink ports: an uplink port A, an uplink port B, an uplink port C, and an uplink port D. In this case, an access control list including 12 entries may be configured in the network device; alternatively, 12 access control lists are configured in the network device, where each access control list includes one entry. For example, the 12 entries in the network device are respectively represented as follows:

1. filter: (input: A, output: B), action: mod dscp/vlan;
2. filter: (input: A, output: C), action: mod dscp/vlan;
3. filter: (input: A, output: D), action: mod dscp/vlan;
4. filter: (input: B, output: A), action: mod dscp/vlan;
5. filter: (input: B, output: C), action: mod dscp/vlan;
6. filter: (input: B, output: D), action: mod dscp/vlan;
7. filter: (input: C, output: A), action: mod dscp/vlan;
8. filter: (input: C, output: B), action: mod dscp/vlan;
9. filter: (input: C, output: D), action: mod dscp/vlan;
10. filter: (input: D, output: A), action: mod dscp/vlan;
11. filter: (input: D, output: B), action: mod dscp/vlan; and
12. filter: (input: D, output: C), action: mod dscp/vlan.

The foregoing 12 entries are used to match an abnormal data flow whose ingress port (input) and egress port (output) are uplink ports and that is in data flows entering the network device. The "action" defines an action to be performed on an abnormal data flow after the network device matches the abnormal data flow by using an entry. The "mod dscp/vlan" indicates modifying a differentiated services code point (DSCP) value of a data packet in the matched abnormal data flow or modifying a virtual local area network (VLAN) priority of a data packet in the matched abnormal data flow. When a source port and a destination port of a data flow that enters the network device match any one of the foregoing 12 entries, it is determined that the data flow is an abnormal data flow.

Optionally, a queue priority of the second egress port queue is lower than that of the first egress port queue. For example, a port of the network device includes three egress port queues whose priorities are respectively 2, 3, and 4. A PFC function is enabled for both the egress port queue whose priority is 3 and the egress port queue whose priority is 4. It is assumed that the first egress port queue is the egress port queue whose priority is 4. In this case, the second egress port queue may be determined from the egress port queue whose priority is 2 or the egress port queue whose priority is 3.

In an implementation of this application, the network device may obtain the second egress port queue that is in the network device and has no abnormal data flow and for which the PFC function is enabled. For example, when an abnormal data flow exists in the first egress port queue, and no abnormal data flow exists in the egress port queue whose priority is 3, the network device may determine the egress port queue whose priority is 3 as the second egress port queue. Because no abnormal data flow exists in the egress port queue whose priority is 3, there is temporarily no risk of PFC deadlock in the egress port queue whose priority is 3. After the abnormal data flow is scheduled to the egress port queue whose priority is 3, a PFC frame sent by an upstream device based on the abnormal data flow is back pressed to the egress port queue whose priority is 3, and a PFC frame transmission closed loop is not formed based on the first egress port queue, to avoid a PFC deadlock in the egress port queue.

In another implementation of this application, the network device may alternatively obtain the second egress port queue that is in the network device and has no abnormal data flow and for which the PFC function is not enabled. For example, when an abnormal data flow exists in the first egress port queue, the network device may determine the egress port queue whose priority is 2 as the second egress port queue. Because the PFC function is not enabled for the egress port queue whose priority is 2, the egress port queue does not back press a PFC frame to the upstream device, and therefore a PFC frame transmission closed loop is not formed, to avoid a PFC deadlock in the egress port queue.

Step 1302: The network device schedules the abnormal data flow to the second egress port queue based on the first entry.

In an optional embodiment of this application, an implementation process of the step 1302 includes: the network device obtains the queue priority of the second egress port queue; and the network device modifies a VLAN priority of a data packet in the abnormal data flow based on the action in the first entry, so that a modified VLAN priority corresponds to the queue priority of the second egress port queue. That the modified VLAN priority corresponds to the queue priority of the second egress port queue means that the data packet whose VLAN priority is modified can enter the second egress port queue. When the action in the first entry is "action: mod vlan", the network device modifies the VLAN priority of the data packet in the abnormal data flow, so that the data packet whose VLAN priority is modified enters the second egress port queue.

For example, it is assumed that a VLAN priority of a data packet whose priority is 4 is m, and a VLAN priority of a data packet whose priority is 3 is n, in other words, the data packet whose VLAN priority is m needs to enter the egress port queue whose priority is 4, and the data packet whose VLAN priority is n needs to enter the egress port queue whose priority is 3. If the VLAN priority of the data packet whose priority is 4 is changed to n, the data packet whose priority is 4 enters the egress port queue whose priority is 3.

In another optional embodiment of this application, an implementation process of the step 1302 includes: the network device obtains a queue priority of the second egress port queue; and the network device modifies a DSCP value of a data packet in the abnormal data flow based on the action in the first entry, so that a modified coded value corresponds to the queue priority of the second egress port queue. That the modified DSCP value corresponds to the queue priority of the second egress port queue means that the data packet whose DSCP value is modified can enter the second egress port queue. When the action in the first entry is "action: mod dscp", the network device modifies the DSCP value of the data packet in the abnormal data flow, so that the data packet whose DSCP value is modified enters the second egress port queue.

For example, it is assumed that a DSCP value of a data packet whose priority is 4 is p, and a DSCP value of a data packet whose priority is 3 is q, in other words, the data packet whose DSCP value is p needs to enter the egress port queue whose priority is 4, and the data packet whose DSCP value is q needs to enter the egress port queue whose priority is 3. If the DSCP value of the data packet whose priority is 4 is changed to q, the data packet whose priority is 4 enters the egress port queue whose priority is 3.

Step 1303: Forward the abnormal data flow by using the second egress port queue.

A sequence of the steps in the method for avoiding a network anomaly provided in this embodiment of this application may be properly adjusted. A step may also be correspondingly added or removed based on a situation. Any variation readily figured out by a person skilled in the art within the technical scope disclosed in this application shall fall within the protection scope of this application, and details are not described herein.

According to the method for avoiding a network anomaly provided in this embodiment of this application, when the network device detects, based on the first entry in the access control list, that the abnormal data flow exists in the first egress port queue, the network device may schedule the abnormal data flow to the second egress port queue based on the action in the first entry, and forward the abnormal data flow by using the second egress port queue. When an egress port queue that is in the upstream device and that is used to buffer the abnormal data flow is congested, a back pressed PFC frame is transmitted to the second egress port queue, to avoid a PFC frame transmission closed loop formed based on the first egress port queue in the communications network, in other words, avoid a PFC deadlock in the egress port queue.

Figure 14:
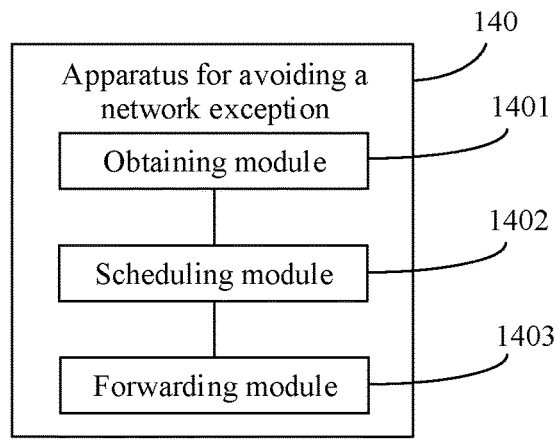
FIG. 14 is a schematic diagram of a structure of an apparatus for avoiding a network anomaly according to an embodiment of this application.

FIG. 14 is a schematic diagram of a structure of an apparatus 140 for avoiding a network anomaly according to an embodiment of this application. The apparatus 140 is applied to a network device. The network device includes a plurality of egress port queues, and an access control list is configured in the network device. Optionally, the network device may be an access-layer network device in the communications network shown in FIG. 2, or the network device may be an aggregation-layer network device or an access-layer network device in the communications network shown in FIG. 3. As shown in FIG. 14, the apparatus 140 includes an obtaining module 1401, configured to: when the network device detects, based on a first entry in the access control list, that an abnormal data flow exists in a first egress port queue, obtain a second egress port queue in which no abnormal data flow exists in the network device, where both an egress port and an ingress port of the abnormal data flow are uplink ports of the network device, and a port in which the first egress port queue is located is the same as a port where the second egress port queue is located; a scheduling module 1402, configured to schedule the abnormal data flow to the second egress port queue based on the first entry; and a forwarding module 1403, configured to forward the abnormal data flow by using the second egress port queue.

In an implementation, the obtaining module 1401 is configured to obtain the second egress port queue that is in the network device and has no abnormal data flow and for which a PFC function is enabled.

In another implementation, the obtaining module 1401 is configured to obtain the second egress port queue that is in the network device and has no abnormal data flow and for which the PFC function is not enabled.

Optionally, the scheduling module 1402 is configured to obtain a queue priority of the second egress port queue; and modify a virtual local area network VLAN priority of a data packet in the abnormal data flow based on an action in the first entry, so that a modified VLAN priority corresponds to the queue priority of the second egress port queue.

Optionally, the scheduling module 1402 is configured to obtain a queue priority of the second egress port queue; and modify a differentiated services code point DSCP value of a data packet in the abnormal data flow based on an action in the first entry, so that a modified coded value corresponds to the queue priority of the second egress port queue.

Optionally, the queue priority of the second egress port queue is lower than that of the first egress port queue.

According to the apparatus for avoiding a network anomaly provided in this embodiment of this application, when detecting, based on the first entry in the access control list, that the abnormal data flow exists in the first egress port queue, the network device may obtain, by using the obtaining module, the second egress port queue in which no abnormal data flow exists in the network device, schedule the abnormal data flow to the second egress port queue based on the action in the first entry by using the scheduling module, and forward the abnormal data flow by using the forwarding module and the second egress port queue. When an egress port queue that is in an upstream device and that is used to buffer the abnormal data flow is congested, a back pressed PFC frame is transmitted to the second egress port queue, to avoid a PFC frame transmission closed loop formed based on the first egress port queue in the communications network, in other words, avoid a PFC deadlock in the egress port queue.

For the apparatus in the foregoing embodiment, specific manners of executing operations by each module are described in detail in the embodiments related to the method, and details are not described herein.

Figure 15:
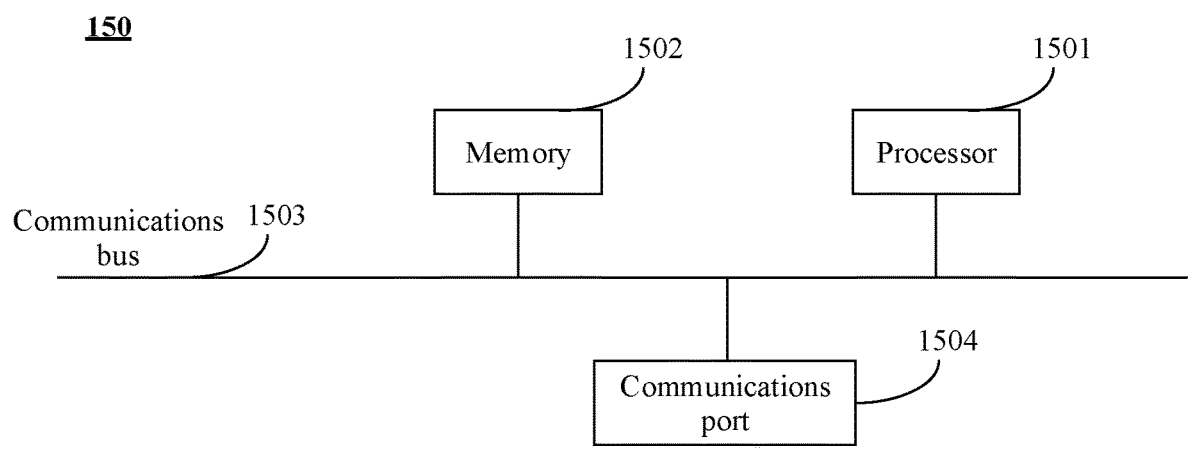
FIG. 15 is a block diagram of a network device/network management device according to an embodiment of this application.

FIG. 15 is a block diagram of a network device/network management device 150 according to an embodiment of this application. As shown in FIG. 15, the network device/network management device 150 includes a processor 1501 and a memory 1502.

The memory 1502 is configured to store a computer program, and the computer program includes a program instruction.

The processor 1501 is configured to invoke the computer program to implement the steps performed by the network device in the method for locating a root cause of a network anomaly shown in FIG. 5, or implement the steps performed by the network management device in the method for locating a root cause of a network anomaly shown in FIG. 5, or implement the method for avoiding a network anomaly shown in FIG. 13.

Optionally, the network device 150 further includes a communications bus 1503 and a communications interface 1504.

The processor 1501 includes one or more processing cores, and the processor 1501 executes various functional applications and data processing by running the computer program.

The memory 1502 may be configured to store the computer program. Optionally, the memory may store an operating system and an application program unit required for at least one function. The operating system may be an operating system such as a real-time operating system (Real Time eXecutive, RTX), LINUX, UNIX, WINDOWS, or OS X.

There may be a plurality of communications interfaces 1504, and the communications interfaces 1504 are configured to communicate with another device.

The memory 1502 and the communications interface 1504 each are connected to the processor 1501 by using the communication bus 1503.

An embodiment of this application further provides a computer storage medium. The computer storage medium stores an instruction. When the instruction is executed by a processor of a network device, the steps executed by the network device in the method for locating a root cause of a network anomaly shown in FIG. 5 are implemented or the method for avoiding a network anomaly shown in FIG. 13 is implemented. When the instruction is executed by a processor of a network management device, the steps executed by the network management device in the method for locating a root cause of a network anomaly shown in FIG. 5 are implemented.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

In the embodiments of this application, the terms "first", "second", and "third" are merely used for a purpose of description, and should not be understood as an indication or implication of relative importance. The term "at least one" refers to one or more, and the term "a plurality of" refers to two or more, unless otherwise specified.

The term "and/or" in this application describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the concept and principle of this application should fall within the protection scope of this application.

What is claimed is:

1. A method for locating a root cause of a network anomaly, wherein the method comprises:
   determining an abnormal data flow in a first egress port queue in a network device when a priority traffic control (PFC) deadlock occurs in the first egress port queue, wherein both an egress port and an ingress port of the abnormal data flow are uplink ports of the network device; and
   sending anomaly information to a network management device, wherein the anomaly information comprises an identifier of the abnormal data flow, an identifier of the network device and another identifier of a port in which the first egress port queue is located.

2. The method of claim 1, further comprising:
   generating an access control list when the PFC deadlock occurs;
   breaking the deadlock in the first egress port queue; and
   further determining the abnormal data flow based on the access control list and in response to data flows that are sent to the first egress port queue.

3. The method of claim 2, wherein the access control list is preconfigured.

4. The method of claim 2, wherein after determining the abnormal data flow, the method further comprises deleting the access control list.

5. The method of claim 1, further comprising determining that the PFC deadlock occurs in the first egress port queue when a quantity of packets from the first egress port queue in a preset time period is 0 and the first egress port queue receives a PFC frame in the preset time period.

6. The method of claim 1, further comprising detecting a throughput of the egress port queue to determine whether a PFC frame is received.

7. A method for locating a root cause of a network anomaly, comprising:
   receiving anomaly information from a network device, wherein the anomaly information comprises a first identifier of an abnormal data flow in a first egress port queue in the network device, a second identifier of the network device, and a third identifier of a port in which the first egress port queue is located, wherein the abnormal data flow is when a priority traffic control (PFC) deadlock occurs in the first egress port queue, and wherein both an egress port and an ingress port of the abnormal data flow are uplink ports of the network device; and
   transmitting the first identifier to a display device.

8. The method of claim 7, further comprising:
   obtaining, when anomaly information from a plurality of network devices is received, a plurality of target network devices that form a PFC deadlock loop based on identifiers of the network devices and a fourth identifier of a location of a port of an egress port queue that has a PFC deadlock in each of the network devices; and
   transmitting a plurality of identifiers of the target network devices to the display device.

9. The method of claim 8, further comprising generating the PFC deadlock loop based on each of the identifiers of the network devices and the fourth identifier, wherein each loop node in the PFC deadlock loop corresponds to one of the target network devices, and wherein transmitting the identifiers of the target network devices comprises transmitting the PFC deadlock loop to the display device.

10. The method of claim 7, wherein the network device is a server, a server cluster, or a cloud computing service center.

11. A network device, wherein the network device comprises:
   a processor; and
   a memory coupled to the processor and storing instructions that, when executed by the processor, cause the network device to be configured to:
      determine an abnormal data flow in a first egress port queue of the network device when a priority traffic control (PFC) deadlock occurs in the first egress port queue, wherein the abnormal data flow comprises an ingress port and an egress port that both are uplink ports of the network; and
      send anomaly information to a network management device, wherein the anomaly information comprises an identifier of the abnormal data flow, an identifier of the network device and another identifier of a port in which the first egress port queue is located.

12. The network device of claim 11, wherein the instructions further cause the network device to be configured to:
generate an access control list when the PFC deadlock occurs;
break the deadlock in the first egress port queue; and
further determine, based on the access control list, the abnormal data flow in response to data flows that are sent to the first egress port queue.

13. The network device of claim 12, wherein the access control list is preconfigured.

14. The network device of claim 12, wherein after the network device determines the abnormal data flow, the instructions further cause the network device to be configured to delete the access control list.

15. The network device of claim 11, wherein the instructions further cause the network device to be configured to determine that the PFC deadlock occurs in the first egress port queue when a quantity of packets from the first egress port queue in a preset time period is 0 and the first egress port queue receives a PFC frame in the preset time period.

16. The network device of claim 11, wherein the instructions further cause the network device to be configured to detect a throughput of the egress port queue to determine whether a PFC frame is received.

17. A network management device, comprising:
a processor; and
a memory coupled to the processor and storing instructions that, when executed by the processor, cause the network management device to be configured to:
receive anomaly information from a network device, wherein the anomaly information comprises a first identifier of an abnormal data flow in a first egress port queue in the network device, a second identifier of the network device, and a third identifier of a port in which the first egress port queue is located, wherein the abnormal data flow is when a priority traffic control (PFC) deadlock occurs in the first egress port queue, and wherein both an egress port and an ingress port of the abnormal data flow are uplink ports of the network device; and
transmitting the first identifier to a display device.

18. The network management device of claim 17, wherein the instructions further cause the network management device to be configured to:
obtain, when anomaly information sent by a plurality of network devices is received, a plurality of target network devices that form a PFC deadlock loop based on identifiers of the network devices and a fourth identifier of a location of a port of an egress port queue that has a PFC deadlock in each of the network devices; and
transmit a plurality of identifiers of the target network devices to the display device.

19. The network management device of claim 18, wherein the instructions further cause the network management device to be configured to generate the PFC deadlock loop based on each of the identifier of the network devices and the fourth identifier, wherein each loop node in the PFC deadlock loop corresponds to one of the target network devices, and wherein transmitting the identifiers of the target network devices comprises transmitting the PFC deadlock loop to the display device.

20. The network management device of claim 17, wherein the network management device is a server, a server cluster, or a cloud computing service center.

* * * * *